United States Patent [11] 3,572,725

[72] Inventor Stewart F. Murphy
Northport, N.Y.
[21] Appl. No. 790,053
[22] Filed Jan. 9, 1969
[45] Patented Mar. 30, 1971
[73] Assignee Pickering and Company, Inc.
Plainview, Long Island, N.Y.

[54] PHONOGRAPHIC PICK-UP AND STYLUS ASSEMBLY HAVING REMOVABLE ATTACHMENT FOR CLEANING RECORD
2 Claims, 6 Drawing Figs.

[52] U.S. Cl. 274/47
[51] Int. Cl. G11b 3/58
[50] Field of Search 274/47

[56] References Cited
UNITED STATES PATENTS

| | | | |
|---|---|---|---|
| 2,259,275 | 10/1941 | Stone | 274/47 |
| 2,773,692 | 12/1956 | Dunnavan | 274/47 |
| 3,185,485 | 5/1965 | Brubaker | 274/47 |

*Primary Examiner*—Harry N. Haroian
*Attorney*—Kane, Dalsimer, Kane, Sullivan and Kurucz

ABSTRACT: A replaceable stylus assembly for a phonographic pickup cartridge is provided with a removable brush for sweeping dust from the record grooves in advance of the path of the stylus. The brush, when mounted on the stylus assembly and when in an operative position is spaced radially inwardly of the stylus toward the center of the record disc and also projecting outwardly at a lateral or transverse angle extending toward the plane of the stylus whereby the brush serves to direct any dust inwardly toward the center of the record disc and away from the stylus.

INVENTOR
STEWART F. MURPHY
BY
Kane, Dalsimer, Kane, Sullivan & Smith
ATTORNEYS

INVENTOR
STEWART F. MURPHY
BY
Kane, Dalsimer, Kane, Sullivan & Smith
ATTORNEYS

PHONOGRAPHIC PICK-UP AND STYLUS ASSEMBLY HAVING REMOVABLE ATTACHMENT FOR CLEANING RECORD

BACKGROUND OF THE INVENTION

Dust and other foreign matter in a record groove in the path of movement of the stylus interferes with accurate record transcription and introduces distortion and scratches in the transcribed sound. In addition, the dust and foreign matter frequently causes surface scratches and damage to the modulations of the record groove. These difficulties and disadvantages resulting from dust and foreign material on the record have long been recognized and various attempts have been made to solve the problem by providing various devices to clean and dust the record prior to use. However it is frequently inconvenient to use such cleaning and dusting devices and, at any rate, the use of such cleaning and dusting devices prior to playing a record is frequently if not usually overlooked. Under any circumstances, even when they have been used, residual dust frequently remains in the record groove or additional dust or foreign material may be deposited on the record after it has been placed in the record player for transcription.

It is therefore the principle object of the present invention to provide an improved sweeping device for use in association with a stylus assembly or phonographic cartridge.

SUMMARY OF THE INVENTION

This and other objects and advantages are attained in accordance with my invention by providing a sweeping device which may be removably mounted to a phonographic stylus assembly or pickup cartridge so as to engage the record surface when the stylus assembly is in use to transcribe the record whereby the record groove is clean in advance of its engagement by the stylus. The cleaning device takes the form of a brush shiftably mounted on the stylus assembly and cartridge and removable therefrom. When positioned on the stylus assembly, the brush is normally urged into engagement with the record groove at a point in advance of the stylus.

DETAILED DESCRIPTION OF THE PREFERRED EMBODIMENT

Figure 1:
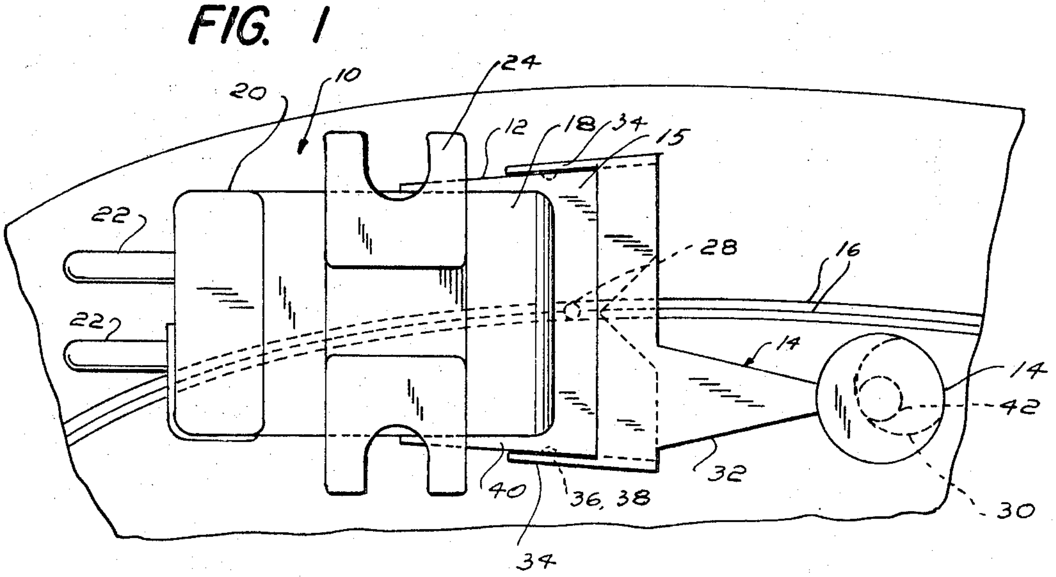
FIG. 1 is a top plan view of a phonographic pickup cartridge and stylus assembly having a sweeping device associated therewith embodying the present invention.

Reference is now made to the drawings and in particular to FIG. 1 wherein a pickup cartridge 10 is depicted as having a replaceable stylus assembly 12 on which the improved sweeping device 14 of the present invention is mounted.

Figure 2:
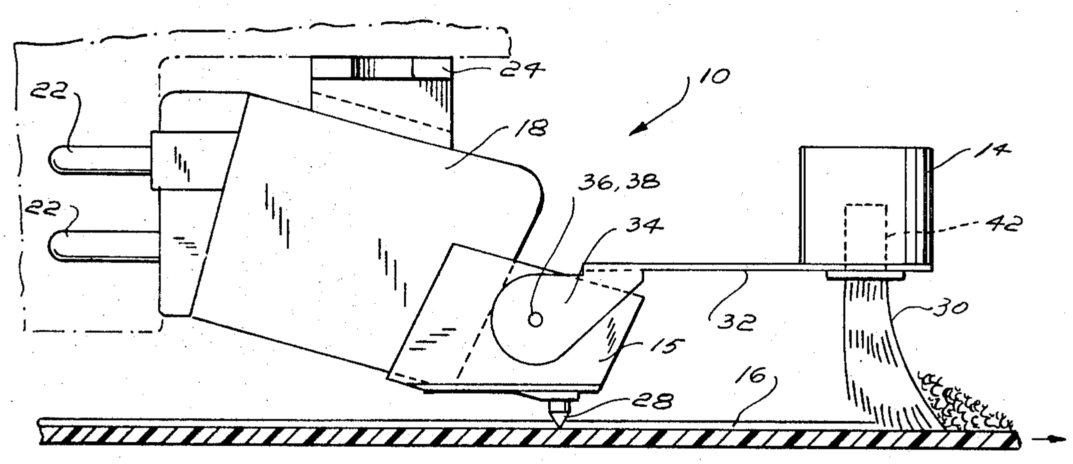
FIG. 2 is a side elevational view of the assembly shown in FIG. 1.
Figure 3:
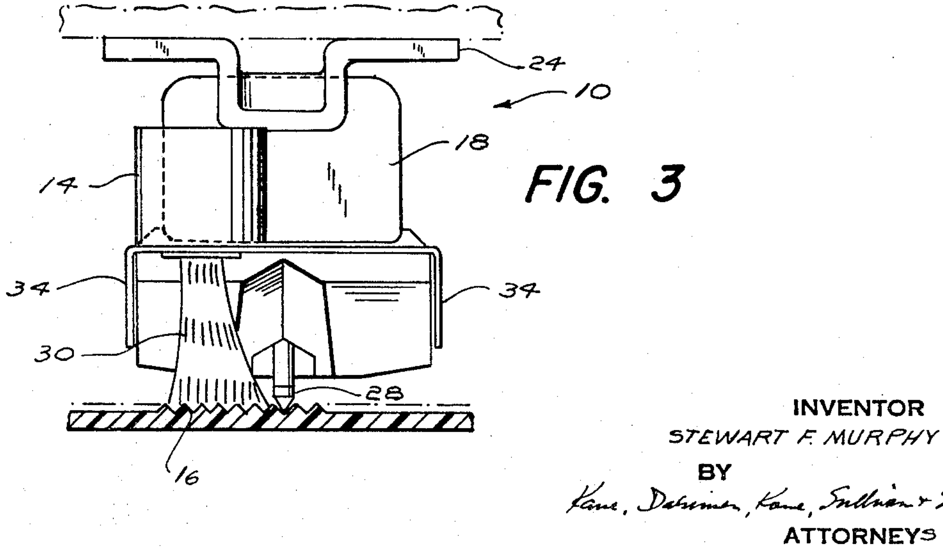
FIG. 3 is a front elevational view of the assembly showing the brush in the position it assumes when it engages a record disc.
Figure 4:
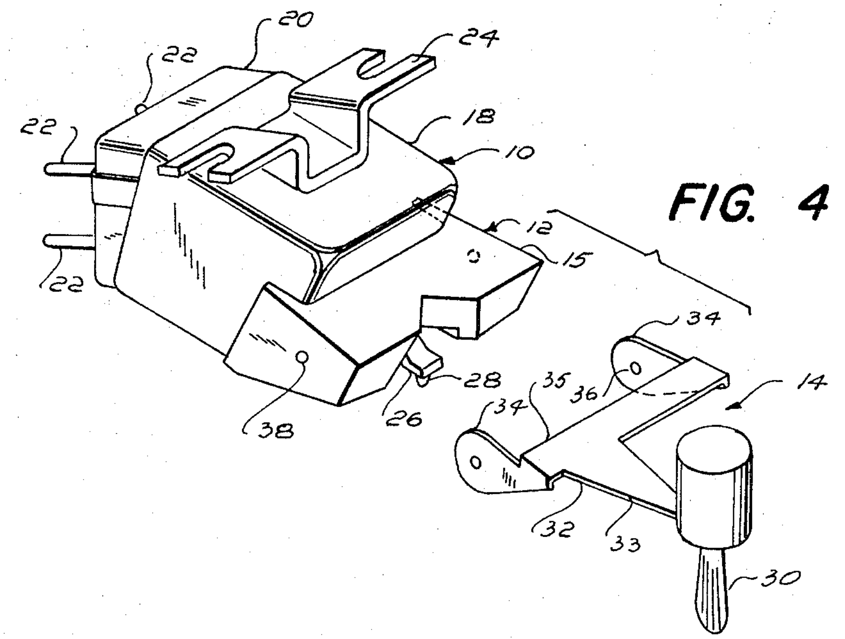
FIG. 4 is an exploded perspective view showing a pickup cartridge with a stylus assembly mounted thereto and a separated sweeping device.
Figures 5, 6:
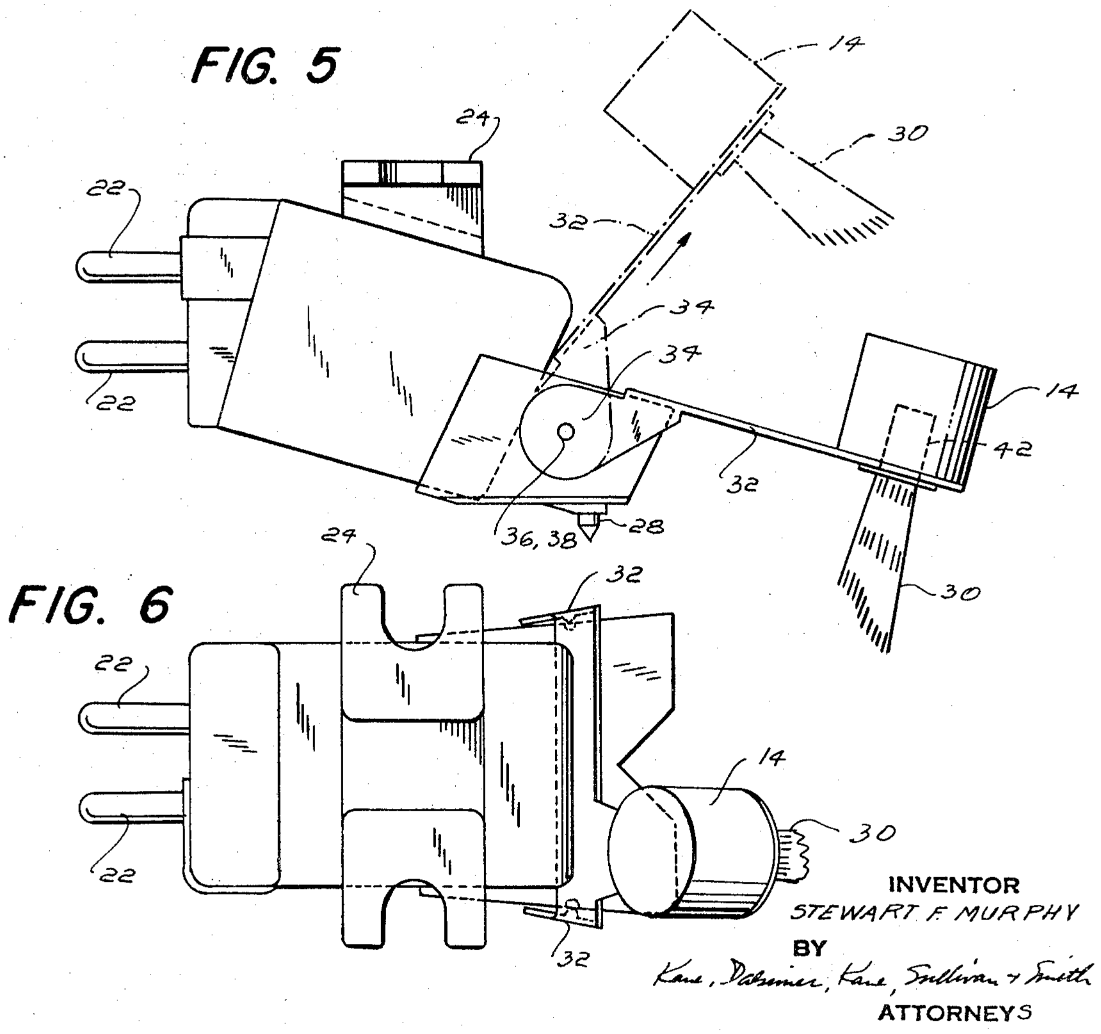
FIG. 5 is a side elevational view of the assembly with the sweeping device shifted to an inoperable position.
FIG. 6 is a top plan view of the assembly depicted in FIG. 5.

The sweeping device is mounted on the stylus assembly so as to be shiftable from an operative position in engagement with the record as depicted in FIG. 2 to an inoperative position elevated above the record as depicted in FIG. 5. The sweeping assembly 14 is laterally offset with respect to the stylus so as to engage the record groove 16 radially inwardly spaced from the stylus as shown in FIG. 3. Thus, even though the sweeping device projects from the trailing end of the stylus assembly, it engages the record groove in the path of movement of the stylus at a point in advance of the stylus.

It should be understood that my improved sweeping device is useable with any form of pickup cartridge or stylus assembly having a stylus for engaging the groove of a record disc. Thus, it is useable with a pickup of the magnetic type, of the piezoelectric or crystal type, or with a pickup of the condenser or electrostatic type.

In the accompanying drawings, the present invention is illustrated as applied to a magnetic stereophonic phonograph pickup of the type disclosed in Ser. No. 342,885, filed Feb. 6, 1964 in the name of Walter O. Stanton. However, it should be understood that the particular type of pickup cartridge does not constitute the present invention and that the present invention is equally applicable to pick up cartridges of other types.

The illustrated pickup assembly comprises a cartridge unit 10 and a separate replaceable stylus assembly 12. The cartridge unit is enclosed in a casing 18, preferably made of a magnetic material, such as Mu metal, which serves as shielding and also serves to provide a portion of the magnetic path of the system. The end of the casing is enclosed by a terminal block 20 which is provided with suitable terminal prongs 22 that are adapted to electrically couple the cartridge to the phonograph. The current generating coils and components of the magnetic circuit of the cartridge assembly are contained within housing 18. A mounting clip 24 is provided on the upper surface of the cartridge assembly for mounting the cartridge in such manner that prongs 22 are suitably electrically connected to the amplifier system associated with the record player.

The stylus assembly 12 illustrated herein includes a record engaging stylus 26 having a jeweled point 28, such as a diamond, suitably supported within the housing 15 of stylus assembly 12. The stylus is connected to the various components of a magnetic circuit located within the stylus housing 15 which are not illustrated but which generally serve to generate a voltage analogue of the modulations of the record groove which, in turn, is translated into a sound output by the amplifiers and speakers of the total audio system.

As previously indicated, the pickup cartridge illustrated and described herein represents one type of pickup cartridge with which the improved sweeping device of the present invention may be employed. It is equally applicable to other types of stylus assemblies and pickup cartridges.

The improved sweeping device 14 comprises a suitable device for cleaning the surface of the record, such as small brush 30 and a mounting means 32 therefor. Mounting 32 includes elongated arm 33 having brush 30 affixed to one end and crossmember 35 affixed to the opposite end. Flanges 34 extend transverse to crossmember 35 generally parallel to arm 33 and protrusions 36 extend inwardly from the inner surfaces of flanges 34. Protrusions 36 are adapted to interengage with bushings 38 in the form of indents provided in the housing 15 of the stylus assembly 12.

Brush 30 comprises a plurality of bristles which may be made of natural bristles or synthetic material, such as nylon. The bristles are suitably secured in a recess 42 in the head portion 44 as for instance for means of a staple or an adhesive. The head portion may be made of a suitable material, such as plastic or metal, and arm 33 may be formed integrally therewith or it may be a separate piece of metal embedded in a plastic head. The lower edge of the bristles 30 generally taper so that the longer bristles are located closer to the center of the record disc. This enables the brush to more completely enter the record grooves and sweep out foreign materials therefrom.

The brush assembly when mounted to the stylus is thus free to pivot about protrusions 36 from an elevated inoperative position to a lowered operative position in engagement with the surface of a record. In this connection it should be noted that both the stylus and brush extend downwardly in a generally vertical direction and that the brush moves in a generally vertical plane. Thus, the brush is normally urged into an operative position in engagement with the record by the force of gravity. Flanges 34 act as inwardly directed biasing spring members serving to cooperate in securing the brush assembly to the stylus assembly. The brush, however, may be easily removed from the stylus merely by removing the protrusions from their associated depressions in the stylus handle.

The tracking force of the brush, i.e., the force with which it engages the surface of the record, should preferably be less than the preferred tracking force of the stylus. As an example, I have found that when the desired tracking force of the stylus is two or three grams, very satisfactory results are obtained if the brush is adjusted so as to have a tracking force of approximately one gram. In addition, it should be understood that the total tracking force applied to the combined brush and stylus assembly should constitute the sum of the tracking force of the brush and the desired tracking force of the stylus. Thus, where the brush has a tracking force of one gram and the stylus has a desired tracking force of three grams, a combined tracking force of four grams should be applied to the assembly.

Mounting 32 and brush 30 are offset laterally with respect to the plane of the stylus as seen most clearly in FIG. 3. In this connection the brush is offset radially inwardly toward the center of the record with respect to the point of engagement between the stylus and record and the brush engages one or two turns or helices of the record groove in advance of the point of engagement between the record groove and the stylus point. Thus, the brush 30 will serve to clean a record groove and to remove dust and foreign matter therefrom prior to engagement of the groove by the stylus. In this way, sound distortion and damage to the surface of the record is avoided.

As indicated, the brush preferably trails behind the trailing end of the stylus assembly beyond the stylus. When in engagement with the record, the brush bristles extend downwardly and laterally at an angle toward the vertical plane in which the stylus is disposed due to the feeding of the cartridge radially inwardly across the record. Due to this fact, the brush serves to direct any dust or foreign matter inwardly toward the center of the record and away from the stylus. In addition, I have found that this angular relationship between the bristles and record surface also serves to minimize so-called "skating" resulting from the departure of the tone arm and the cartridge from tangential relationship with the record groove as the stylus feeds the tone arm inwardly across the record. Tapering the brush bristles in the manner depicted further improves the performance of the brush.

In using the improved sweeping device of the present invention the brush 14 is first mounted to a stylus assembly suitably provided with spaced depressions for receiving the brush. The stylus assembly is then inserted in a cartridge which in turn has either been previously mounted on or is subsequently mounted on a tone arm of a record player with its contact prongs suitably connected with the preamplifiers of an amplification system. Alternately, the cartridge and stylus may previously have been mounted on a tone arm and the brush assembly is then positioned on the premounted stylus.

The record is played in the usual manner by engaging the stylus with the groove of the record. Under those circumstances, the brush 30 is urged downwardly under the force of gravity so that the bristles engage the record groove. As illustrated, the bristles engage a few turns of the groove disposed immediately inwardly from the turn of the groove engage by the stylus so that the groove is clean of all dust and foreign material at a point prior to the point of engagement by the stylus. Due to the pivotal mounting of the brush, it can shift upwardly in response to surface irregularities of the record. Also due to the fact that the tracking force of the brush is substantially lighter than the tracking force of the stylus the movement of the brush in response to surface irregularities does not affect the tracking of the record groove by the stylus. In this manner distortion of the reproduced sound and damage to the record surface resulting from dust and foreign material is effectively eliminated.

In the event that either the stylus assembly or brush assembly become unuseable through normal wear or unusually rough handling, that assembly may be replaced without necessitating the replacement of the other assembly resulting in a savings to the consumer. Similarily if for any reason it is desired to play the record disc without presweeping, the brush may be removed from the stylus assembly and thereafter replaced.

It will thus be seen that I have provided an improved sweeping device for use with a stylus assembly or phonograph cartridge pickup. It will also be seen that the sweeping device may be removably mounted to the stylus assembly, is simple to manufacture, install and operate and that it serves affectively to clean the record in advance of the point of engagement of the record by the stylus. Modifications may be made in the illustrated and described embodiment of my invention without departing from the invention as set forth in the accompanying claims.

I claim:

1. A replaceable stylus assembly for a phonograph pickup cartridge of the type used with a phonograph record disc having a sound modulated spiral record groove, said replaceable stylus assembly comprising: a supporting structure; a stylus projecting outwardly from the supporting structure so as to be engageable with a record groove to translate the modulations into mechanical vibrations; a brush comprising a plurality of bristles for sweeping dust from the record in the path of the stylus in advance thereof, said brush having a lower, record engaging edge and said bristles tapering outwardly and downwardly toward said lower edge; an elongated arm having said brush affixed to one end; a transverse cross member fixed at one end thereof to the other end of said arm; mounting means for removably and freely pivotally mounting said brush on said supporting structure so as to enable said brush to be freely shiftable between an operative position projecting outwardly in the same general direction as the stylus for at least the same distance and an inoperative position in which it projects outwardly less than the stylus, said mounting means including two opposed, spaced apart flanges extending laterally from said cross member, said flanges each have inwardly extending portions thereon adapted to engage depressed portions on said stylus assembly supporting structure; and depressed portions in said stylus assembly supporting structure spaced so as to receive said inwardly extending portions of said flanges and to cooperate therewith in freely pivotally supporting said brush to said stylus assembly supporting structure, said mounting means being arranged so that said brush is normally urged outwardly toward the operative position to engage the record groove in the path of the stylus and at a point in advance thereof, said brush being offset laterally in a plane which is spaced radially inwardly of said stylus toward the center of the record disc when the assembly is in said operating position with the brush projecting outwardly from the mounting means at a transverse angle extending toward the plane of the stylus whereby the brush serves to direct any dust inwardly toward the center of the record grooves and away from the stylus.

2. An improved brush assembly adapted to be removably mounted to a stylus assembly for a phonograph pickup cartridge of the type used with a phonograph record disc having a sound modulated spiral record groove, said stylus assembly comprising a supporting structure having spaced, depressed portions and a stylus which projects outwardly from the supporting structure so as to be engageable with a record groove to translate the modulations into mechanical vibrations, said brush assembly comprising: a brush formed of a plurality of bristles for sweeping dust from the record in the path of the stylus in advance thereof, said brush having a lower, record engaging edge and said bristles tapering outwardly and downwardly toward said lower edge; an elongated arm having said brush affixed to one end; a transverse cross member fixed to one end thereof to the other end of said arm; and mounting means for removably and freely pivotally mounting said brush on said supporting structure so as to enable said brush to be freely shifted between an operative position projecting outwardly in the same general direction as the stylus for at least the same distance and an inoperative position in which it projects outwardly less than the stylus, said mounting means including two opposed, spaced apart flanges extending laterally from said cross member, said flanges each have inwardly extending portions thereon adapted to engage said depressed portions of said stylus assembly supporting structure, said mounting means being arranged so that said brush is normally urged outwardly toward said operative position to engage the record groove in the path of the stylus and at a point in advance thereof, said brush being offset laterally in a plane which is spaced radially inwardly of said stylus toward the center of the record disc when the assembly is in operating position with the brush projecting outwardly from the mounting means at a transverse angle extending toward the plane of the stylus whereby the brush serves to direct any dust inwardly toward the center of the record disc and away from the stylus.